(12) United States Patent
Yang

(10) Patent No.: US 11,378,240 B1
(45) Date of Patent: Jul. 5, 2022

(54) LIGHT AND SHADOW WATER BALL STRUCTURE

(71) Applicant: Chin-Sheng Yang, Tainan (TW)

(72) Inventor: Chin-Sheng Yang, Tainan (TW)

( * ) Notice: Subject to any disclaimer, the term of this patent is extended or adjusted under 35 U.S.C. 154(b) by 0 days.

(21) Appl. No.: 17/458,588

(22) Filed: Aug. 27, 2021

(51) Int. Cl.
| | |
|---|---|
| *F21S 10/02* | (2006.01) |
| *G02B 27/42* | (2006.01) |
| *G03B 21/20* | (2006.01) |
| *F21V 23/00* | (2015.01) |
| *F21V 23/04* | (2006.01) |
| *G03B 21/608* | (2014.01) |
| *F21W 121/00* | (2006.01) |

(52) U.S. Cl.
CPC .......... *F21S 10/026* (2013.01); *F21V 23/004* (2013.01); *F21V 23/0407* (2013.01); *G02B 27/425* (2013.01); *G03B 21/20* (2013.01); *G03B 21/608* (2013.01); *F21W 2121/006* (2013.01)

(58) Field of Classification Search
CPC .. F21S 10/026; F21V 23/004; F21V 23/0407; G02B 27/425; G03B 21/20; G03B 21/608; F21W 2121/006
See application file for complete search history.

*Primary Examiner* — Anne M Hines
(74) *Attorney, Agent, or Firm* — Leong C. Lei

(57) ABSTRACT

A light and shadow water ball structure mainly includes a seat body, water ball and projector, where the water ball is fixed to the seat body, and the projector includes a projection seat and grating sheet; the projection seat is configured on one side of the water ball, and the inside of the projection seat is provided with a projection passage, where one end of the projection passage is formed an opening, the inside of the projection passage is provided with a light-emitting element and grating sheet spaced from each other, and the grating sheet has a pattern projected on an object outside the seat body through the light emitted from the first light-emitting element.

6 Claims, 7 Drawing Sheets

LIGHT AND SHADOW WATER BALL STRUCTURE

TECHNICAL FIELD OF THE INVENTION

The present invention relates to a water ball decoration, and more particularly to a structure with projection effect.

DESCRIPTION OF THE PRIOR ART

Generally, in addition to the lamps that illuminate the big environment in the house, the footprints of decorative lighting can be seen in the living room and bedroom, and such kind of lighting mainly illuminates a small part of local space or is used as a decorative embellishment to increase the atmosphere of the environment.

For example, the lamp decoration disclosed in U.S. Pat. No. 9,222,663 B1 applied by and approved for the applicant of the present invention mainly is a water lamp structure with a top decoration, including a base, main body and top ornament in sequence from bottom to top, where the top ornament is in a foggy and transparent three-dimensional shape and has a light-emitting element inside. Whereby, when the base is turned on, light emitted from the light source inside the top ornament will be transmitted to produce lighting and dynamic visual effects in combination with the flowing of the low boiling point liquid inside the water lamp main body below. However, the above structure is only limited to the outside of the water ball main body to do static design and change.

SUMMARY OF THE INVENTION

To combine the above-mentioned water ball lamp decoration with decorative and lighting functions with the interesting effects or the advantage of breaking through visual appearance of other parts, and to make the product more popular with the public, the present invention proposes a light and shadow water ball structure, including: a seat body, having an electric control unit comprising a power source configured inside the seat body and a first light-emitting element in electric connection with the power source; a water ball, being a transparent three-dimensional type, fixed to the seat body, and slightly thick flowable liquid filled inside the water ball; and a projector, including a projection seat and grating sheet, the projection seat configured on one side of the water ball, and an inside of the projection seat provided with a projection passage, one end of the projection passage formed an opening, the first light-emitting element configured on a bottom of the projection passage, the grating sheet configured on the projection passage, and having a space from the first light-emitting element, the grating sheet having a pattern, and the pattern projected on an object outside the seat body through light emitted from the first light-emitting element, achieving a changing projection effect of light and shadow being formed outside the seat body.

DETAILED DESCRIPTION OF THE PREFERRED EMBODIMENTS

Figure 1:
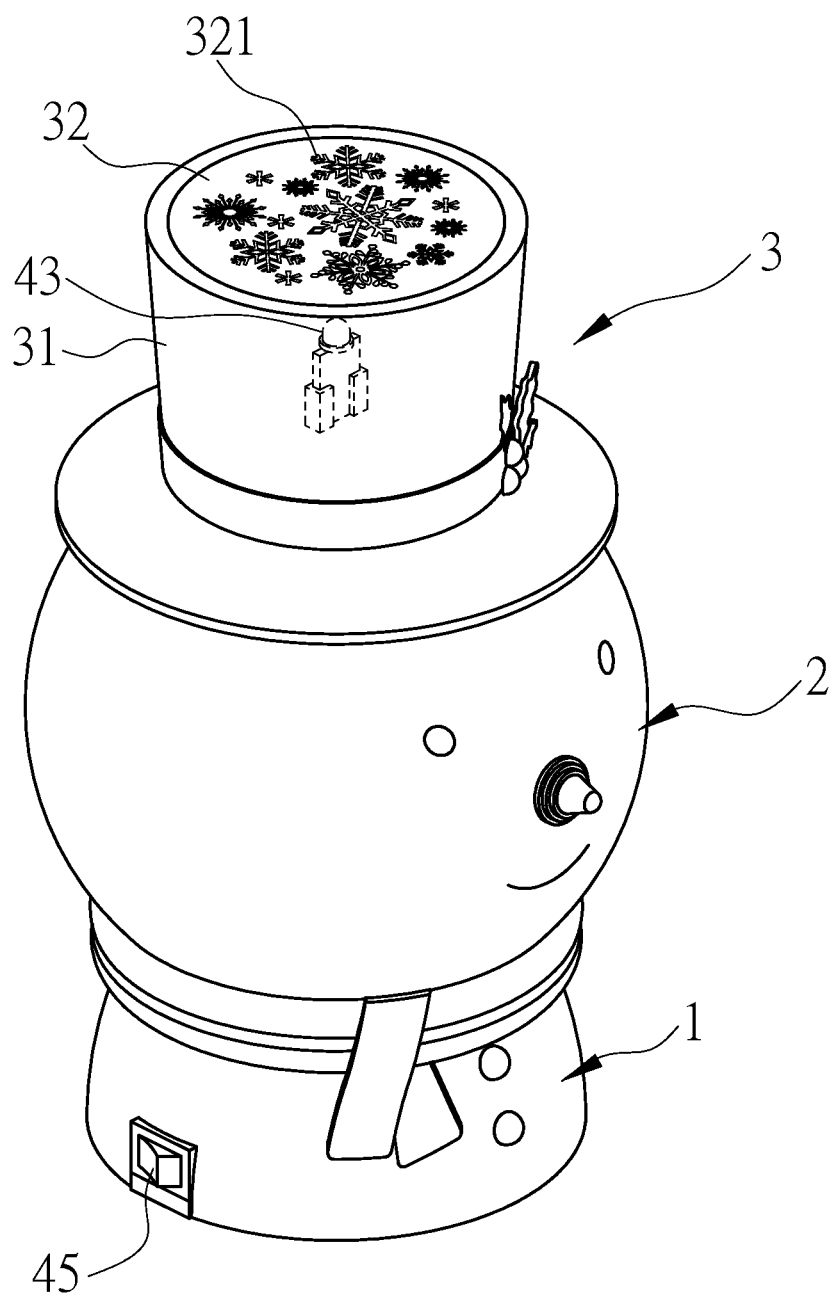
FIG. 1 is a perspective view of the present invention.
Figure 2:
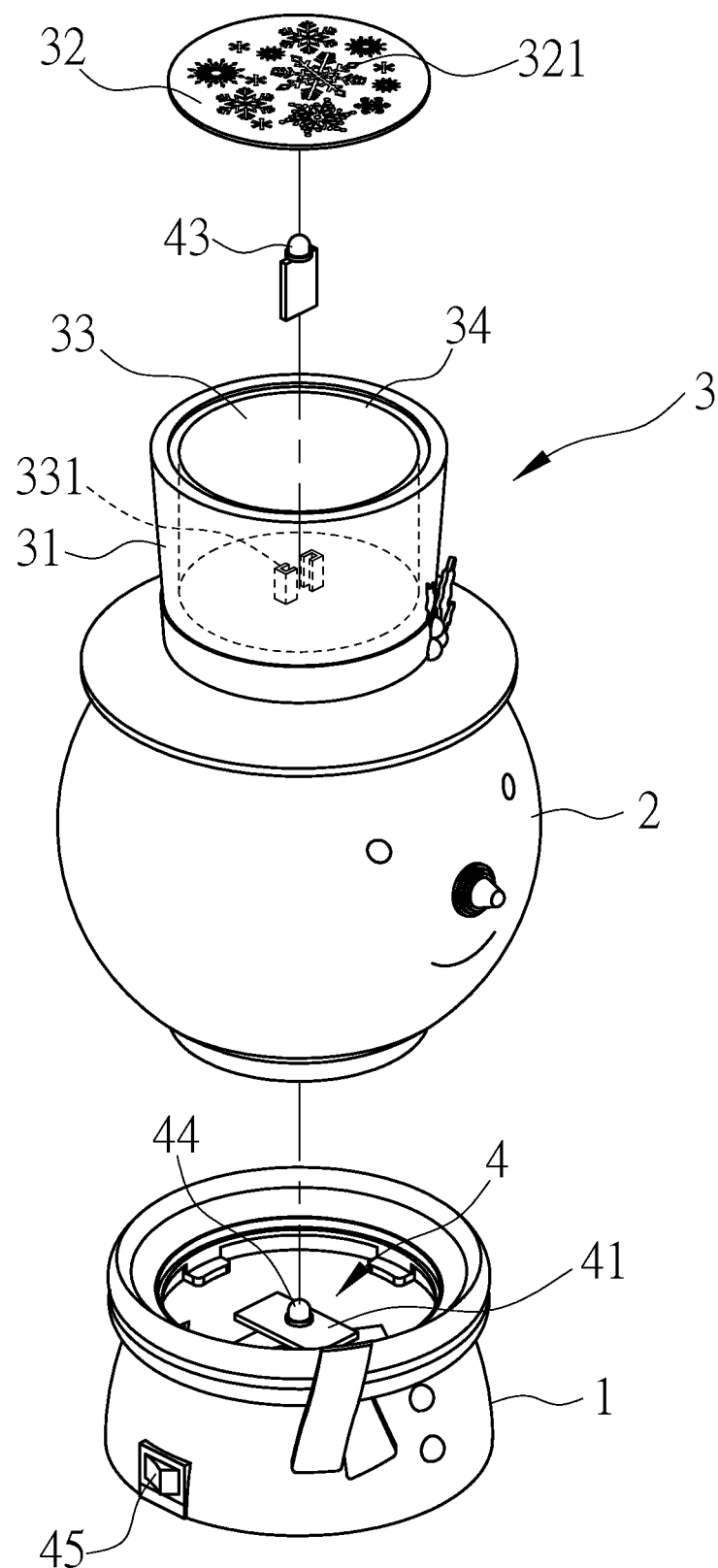
FIG. 2 is an exploded view of the present invention.
Figure 3:
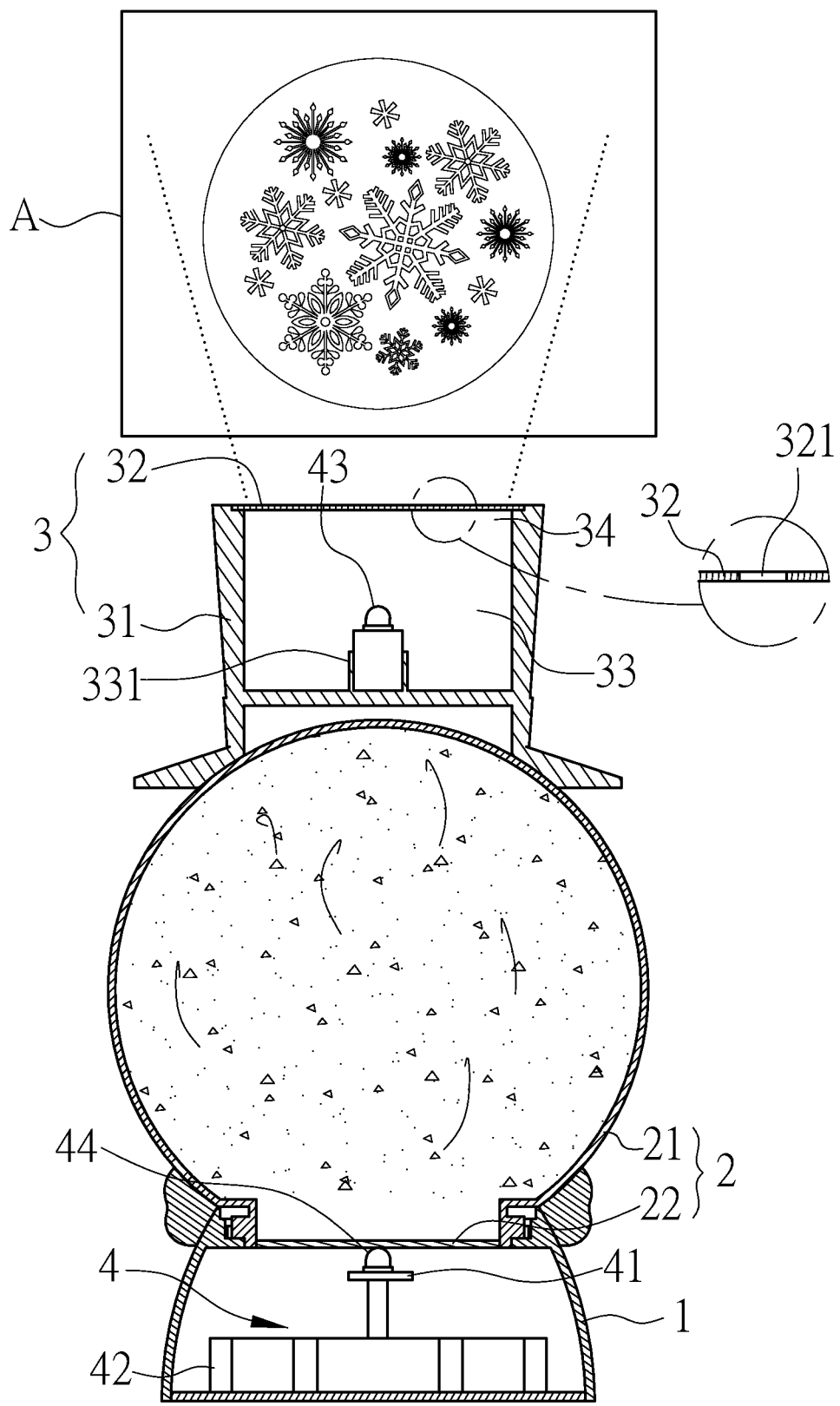
FIG. 3 is a cross-sectional view of the present invention in a projection state.

Referring to FIGS. 1 to 3, a light and shadow water ball structure of the present invention, in a preferred embodiment, mainly includes a seat body 1, water ball 2 and projector 3.

The inside of the seat body 1 is hollow, and the top thereof is open; the inside of the seat body 1 is provided with an electric control unit 4 including a circuit board 41, power source 42, first light-emitting element 43, second light-emitting element 44 and switch 45, where the power source 42, first light-emitting element 43, second light-emitting element 44 and switch 45 are respectively in electric connection with the circuit board 41, and the circuit board 41 is in electric connection with the power source 42, where the power of the power source 42 may come from mains or battery, and the switch 45 is used to open or close the power supplied to the power source 42. The first light-emitting element 43 is configured inside the projector 3, and the second light-emitting element 44 the seat body 1 and illuminates toward the water ball 2.

In the embodiment, water ball 2 is a transparent three-dimensional type, and fixed to the open position of the top of the seat body 1, where the water ball 2 includes a shell 21 and bottom cover 22, where the bottom of the shell 21 is formed an open end, and the bottom cover 22 is configured on the bottom of the shell 21 and adapted to seal the open end. The water ball 2 is sealed and filled with slightly thick flowable liquid, and glitter and sequins may be added to the liquid in order to additionally decorate the water ball 2. When the liquid is flowing, the second light-emitting element 444 irradiates the liquid to produce a dazzling visual change.

The projector 3 includes a projection seat 31 and grating sheet 32. In the embodiment, the projection seat 31 is a three-dimensional type matching with the type design of the water ball 2 and configured on the top side of water ball 2, and the inside of the projection seat 31 is provided with a projection passage 33, one end of which is formed into opening 34, and another end thereof is provided with a fixing seat 331, to which the first light-emitting element 43 is fixed, and the light thereof irradiates toward the opening 34; the grating sheet 32 is configured at the opening 34 of the projection passage 33, and spaced from the first light-emitting element 43, where the grating sheet 32 has a pattern 321, which is projected on an object A outside the projection seat 31 through the light emitted from the first light-emitting element 43. In the embodiment, it is projected on a wall surface as an example as shown in the figures, but the present invention is not so limited.

As stated above, the form of the pattern 321 is not limited according to the present invention, it can be as shown in the partial enlarged view of FIG. 3; the pattern 321 is through holes passed through the thickness of the grating sheet 32. Otherwise, the grating sheet 32 is transparent, the inner surface or outer surface thereof is provided with an opaque coating layer 322, for example, formed by way of pigment coating or electroplating. Furthermore, a special process is used to remove the predetermined parts of the coating layer 322. For example, laser engraving is used to remove the predetermined parts to form hollowing-out, the hollowing-out is the pattern 321, allowing the light emitted from the first light-emitting element 43 to pass through the pattern 321 to project it on an object A, and the circuit board 41 can control the light color change of the first light-emitting element 43 and second light-emitting element 44, allowing the light projection to add a change effect.

Figure 4:
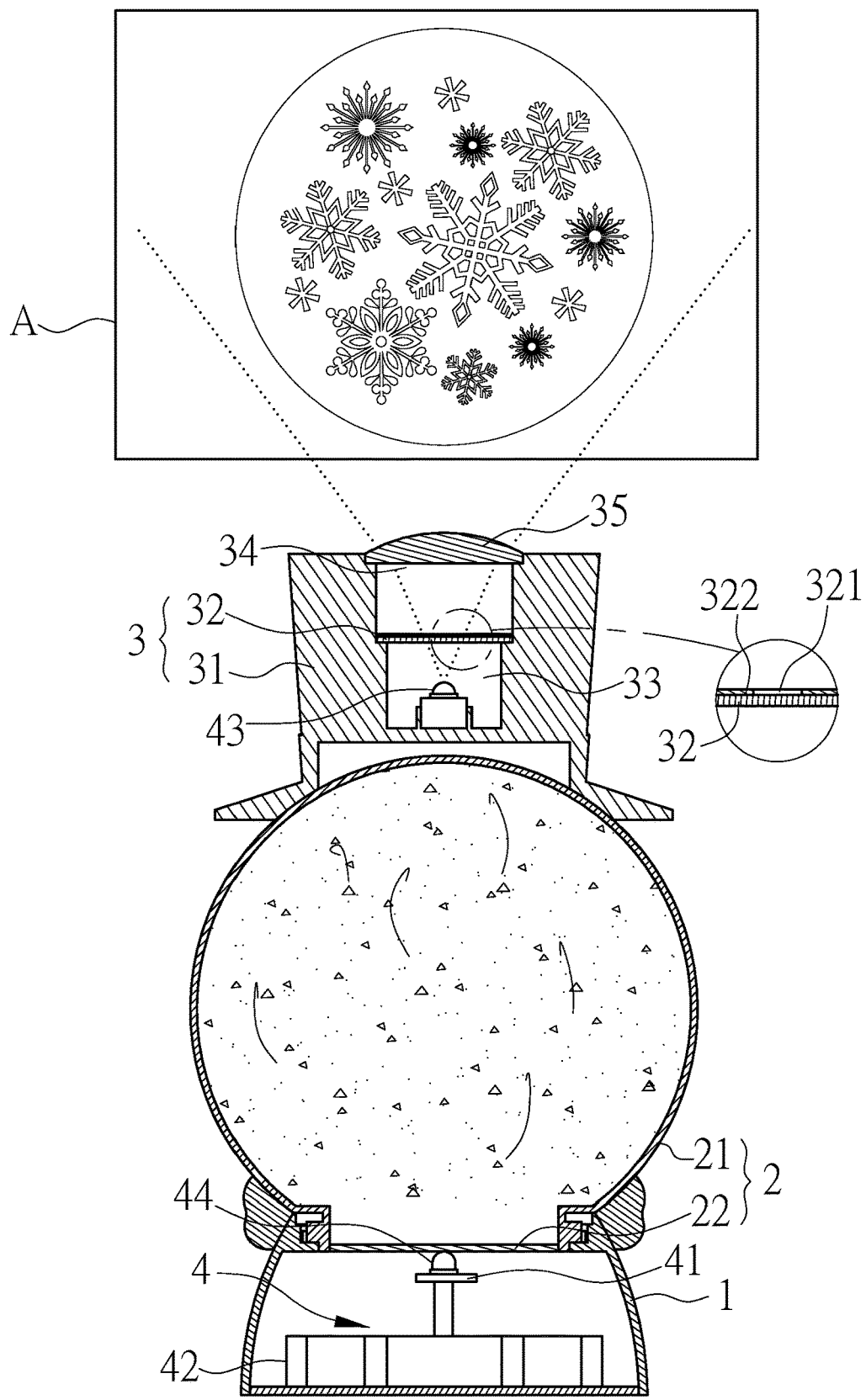
FIG. 4 is a cross-sectional view of a second embodiment of the present invention in a projection state.

Next, referring to FIG. 4, the figure shows a second embodiment of the present invention varied according to the above structure, so the same components are not described again. In the embodiment, the projector 3 further includes a convex lens 35 fixed at the opening 34 of the projection passage 33. In the embodiment, the convex lens 35, grating sheet 32 and first light-emitting element 43 are respectively formed a space from each other with an appropriate distance.

When the power source 42 is powered on, the light of the first light-emitting element 43 irradiates toward the grating sheet 32 to project the pattern 321 on an object A through the amplification of the convex lens 35, forming an effect having a projection change.

Figure 5:
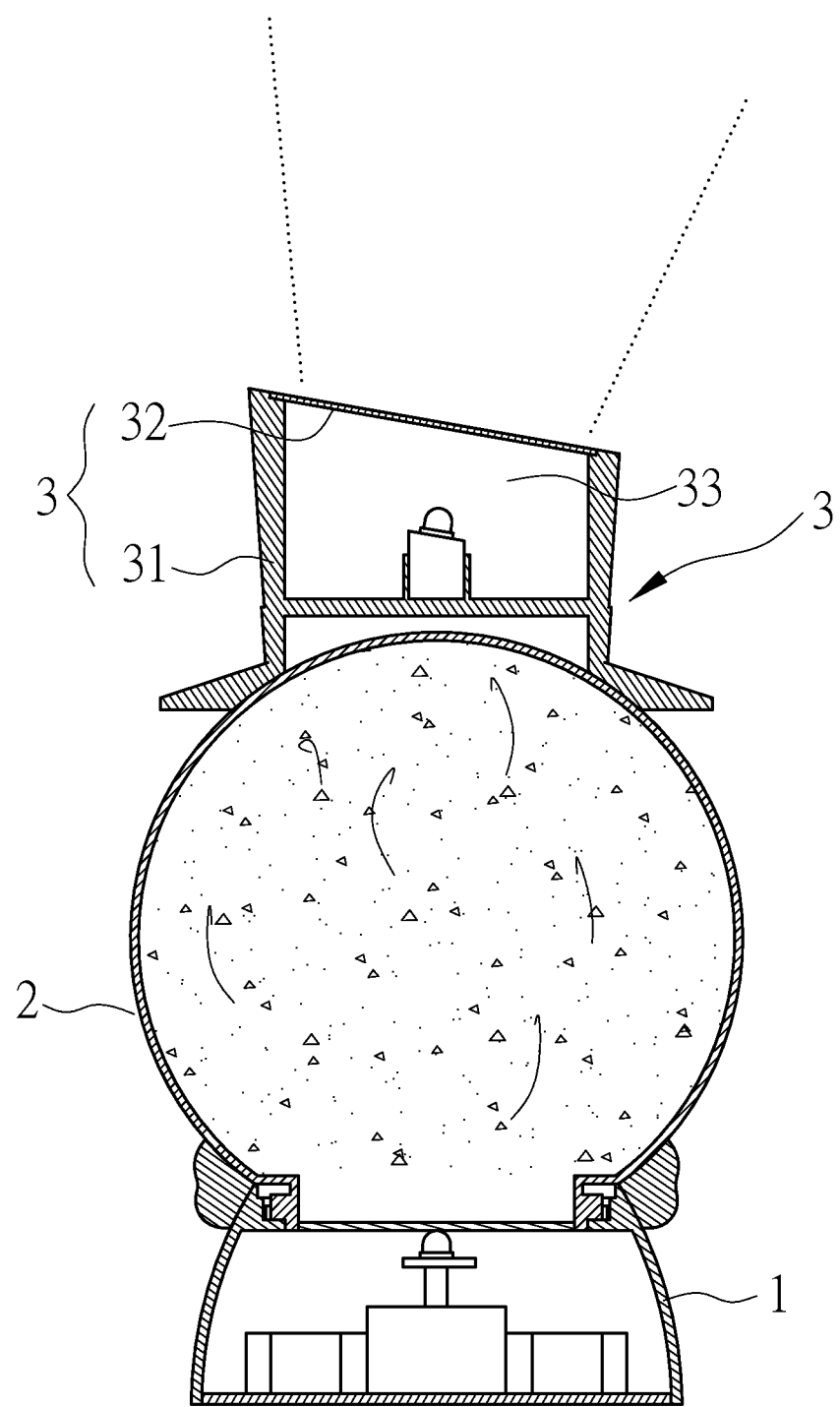
FIG. 5 is a cross-sectional view of a third embodiment of the present invention in a projection state.

Furthermore, FIGS. 1 to 4 are all shown in the upright projection state. Referring to FIG. 5, the figure shows a third embodiment of the present invention. The side of the projection passage 33 having the opening 34 is in an inclined surface state, and the grating sheet 32 and first light-emitting element 43 are arranged in an inclined state with the inclined surface. Whereby, the projection direction of the pattern 321 of the grating sheet 32 is then inclined at an angle with the axial direction of the water ball 2.

Figure 6:
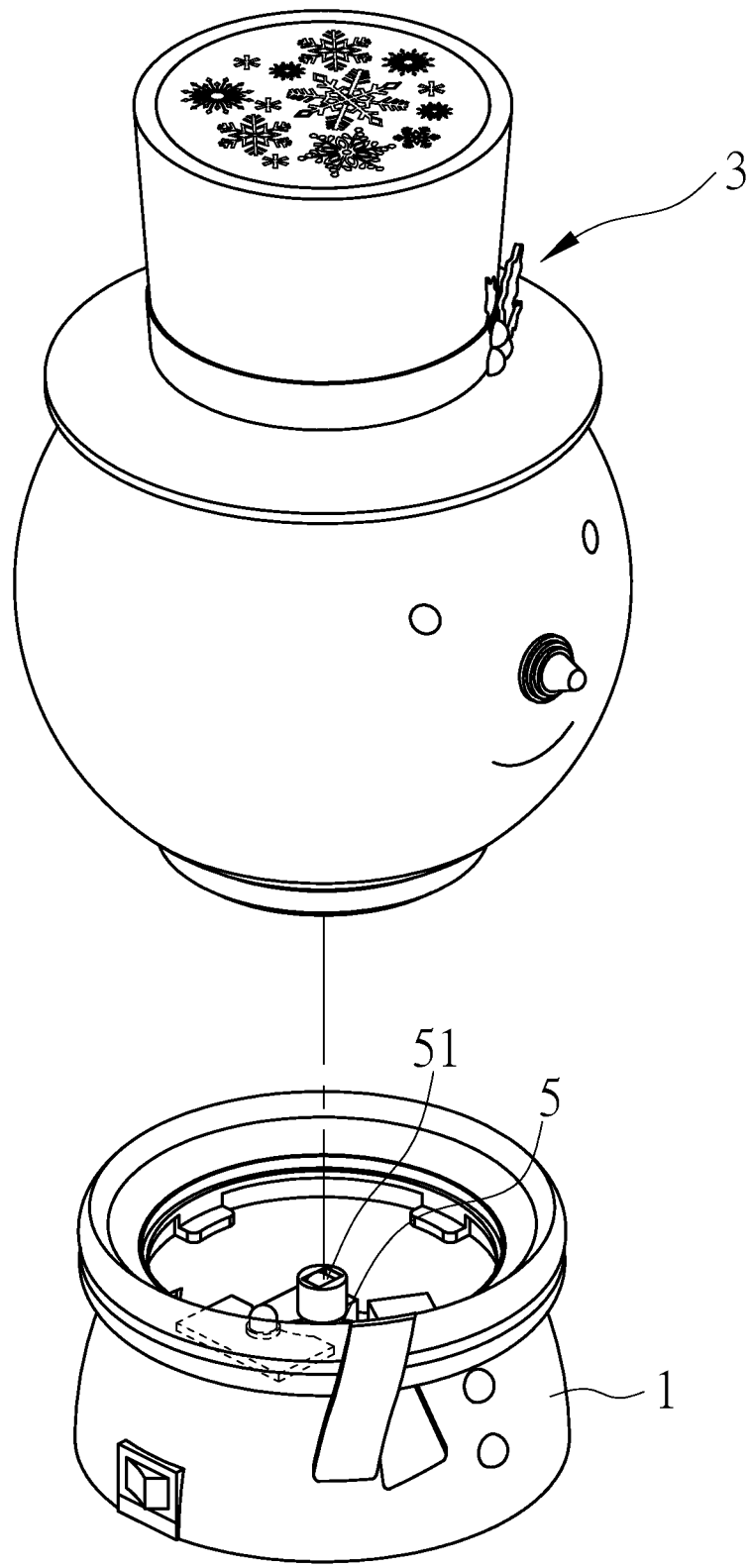
FIG. 6 is an exploded view of a fourth embodiment of the present invention.
Figure 7:
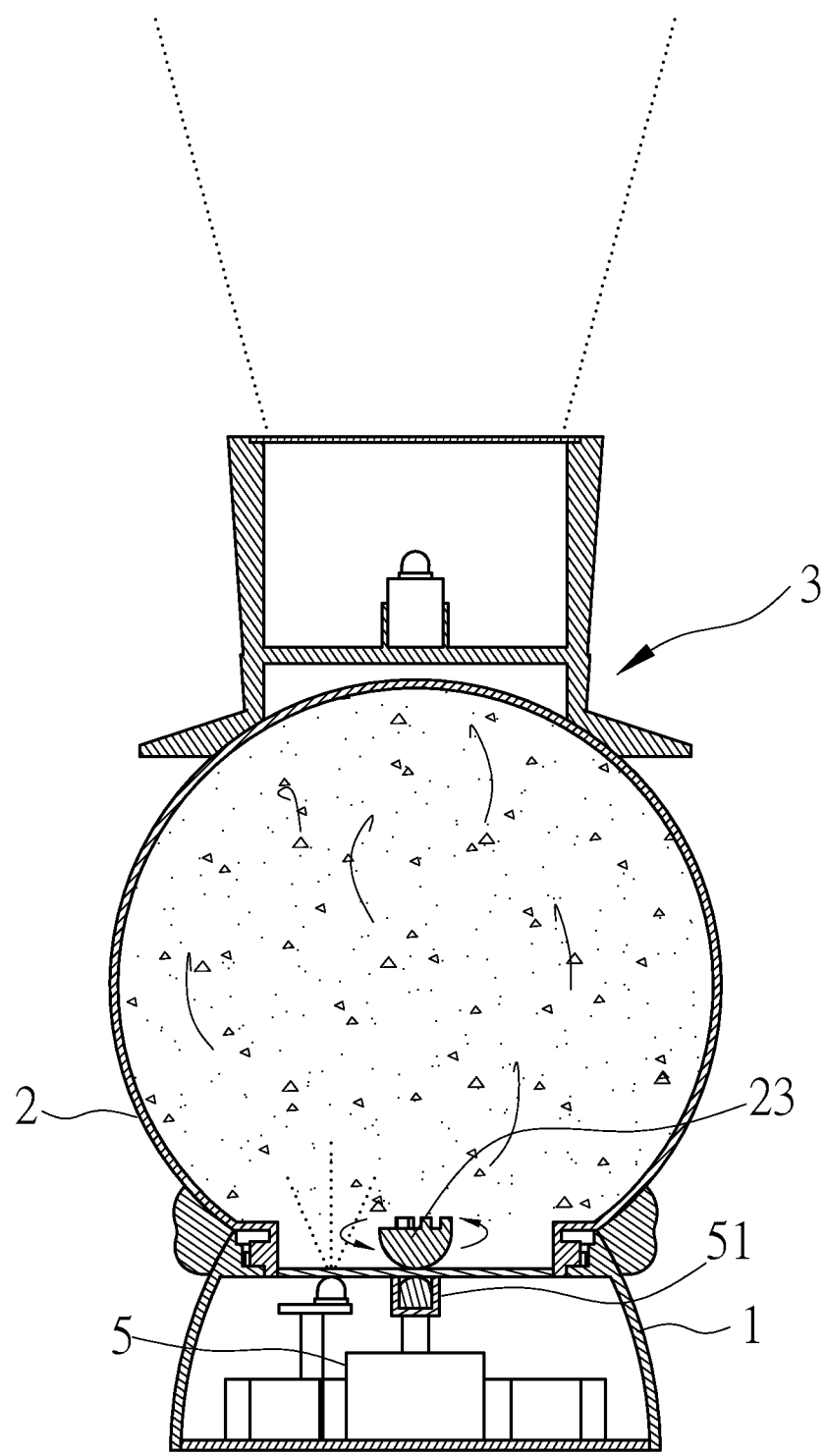
FIG. 7 is a cross-sectional view of the fourth embodiment of the present invention.

Referring to FIGS. 6 and 7, the figures show a fourth embodiment of the present invention varied according to the above structure. In the embodiment, the inside of the seat body 1 is provided with a motor 5 with a magnetic rotating shaft 51 in electric connection with the power source 42. The inside of the water ball 2 is provided with a magnetic rotating element 23. When the motor 5 is rotated, the rotating element 23 is magnetically attracted by the magnetic rotating shaft 51 to rotate with it, and further to disturb the liquid and sequins, glitter, allowing them to generate a flowing effect.

I claim:

1. A light and shadow water ball structure, comprising:
   a seat body, having an electric control unit comprising a power source configured inside said seat body and a first light-emitting element in electric connection with said power source;
   a water ball, being a transparent three-dimensional shape, fixed to said seat body, and flowable liquid filled inside said water ball; and
   a projector, comprising a projection seat and grating sheet, said projection seat configured on one side of said water ball, and an inside of said projection seat provided with a projection passage, one end of said projection passage formed an opening, said first light-emitting element configured on a bottom of said projection passage, said grating sheet configured on said projection passage, and having a space from said first light-emitting element, said grating sheet having a pattern, and said pattern projected on an object outside said seat body through light emitted from said first light-emitting element.

2. The structure according to claim 1, wherein said projector further comprises a convex lens fixed to said opening of said projection passage, and said convex lens is spaced from said grating sheet.

3. The structure according to claim 1, wherein said pattern is through holes passed through a thickness of said grating sheet.

4. The structure according to claim 1, wherein said grating sheet is transparent, an inner surface or outer surface thereof is provided with a coating layer, and said pattern is configured on said coating layer.

5. The structure according to claim 1, wherein said electric control unit further comprises a circuit board, second light-emitting element and switch configured on said seat body, and said power source, second light-emitting element and switch are respectively in electric connection with said circuit board.

6. The structure according to claim 1, wherein a motor with a magnetic rotating shaft is provided inside said seat body, said motor is in electric connection with said power source, a magnetic rotating element is provided inside said water ball, and said rotating element is magnetically attracted by said magnetic rotating shaft to rotate therewith.

* * * * *